US009184981B2

(12) United States Patent
Sarikaya (10) Patent No.: US 9,184,981 B2
(45) Date of Patent: Nov. 10, 2015

(54) SYSTEM AND APPARATUS FOR DISTRIBUTED MOBILITY MANAGEMENT BASED NETWORK LAYER VIRTUAL MACHINE MOBILITY PROTOCOL

(71) Applicant: Futurewei Technologies, Inc., Plano, TX (US)

(72) Inventor: Behcet Sarikaya, Wylie, TX (US)

(73) Assignee: Futurewei Technologies, Inc., Plano, TX (US)

( * ) Notice: Subject to any disclaimer, the term of this patent is extended or adjusted under 35 U.S.C. 154(b) by 354 days.

(21) Appl. No.: 13/791,142

(22) Filed: Mar. 8, 2013

(65) Prior Publication Data

US 2013/0238802 A1 Sep. 12, 2013

Related U.S. Application Data

(60) Provisional application No. 61/609,110, filed on Mar. 9, 2012.

(51) Int. Cl.
| | | |
|---|---|---|
| H04L 29/08 | (2006.01) | |
| H04L 12/24 | (2006.01) | |
| G06F 9/455 | (2006.01) | |
| G06F 15/16 | (2006.01) | |
| H04L 29/12 | (2006.01) | |

(52) U.S. Cl.
CPC ...... *H04L 29/08153* (2013.01); *G06F 9/45558* (2013.01); *H04L 41/0806* (2013.01); *G06F 2009/4557* (2013.01); *H04L 61/1511* (2013.01); *H04L 61/2076* (2013.01); *H04L 61/2084* (2013.01)

(58) Field of Classification Search
CPC .............. G06F 2009/4557; G06F 9/45558; H04L 29/08153; H04L 41/0806; H04L 61/1511; H04L 61/2076; H04L 61/2084
USPC ................................. 709/226; 718/104–105
See application file for complete search history.

(56) References Cited

U.S. PATENT DOCUMENTS

| | | | | |
|---|---|---|---|---|
| 8,661,434 | B1 * | 2/2014 | Liang et al. | 718/1 |
| 8,874,749 | B1 * | 10/2014 | Vittal et al. | 709/226 |
| 2005/0268298 | A1 * | 12/2005 | Hunt et al. | 718/1 |
| 2007/0245338 | A1 * | 10/2007 | Musha | 717/173 |
| 2009/0064136 | A1 * | 3/2009 | Dow et al. | 718/1 |

(Continued)

OTHER PUBLICATIONS

Li et al., HyperMIP: Hypervisor controlled Mobile IP for Virtual Machine Live Migration across Networks, 2008, IEEE, pp. 80-88.*

(Continued)

*Primary Examiner* — Alina N Boutah
(74) *Attorney, Agent, or Firm* — Conley Rose, P.C.; Grant Rodolph; Brandt D. Howell (57) ABSTRACT

A network element (NE) comprising a hypervisor configured to receive a first virtual machine (VM) from a source hypervisor, and send a first VM mobility registration request to a management node, wherein the first VM mobility registration request comprises a VM identifier associated with the first VM and an internet protocol (IP) address associated with the hypervisor. Also disclosed is a management node comprising a binding cache, and a processor, wherein the processor is configured to receive a first VM mobility registration request from a first hypervisor, wherein the first VM mobility registration is associated with a VM, and record VM information from the first VM mobility registration request in an entry of the binding cache.

21 Claims, 8 Drawing Sheets

(56) References Cited

U.S. PATENT DOCUMENTS

| | | | |
|---|---|---|---|
| 2009/0187904 A1* | 7/2009 | Serebrin et al. | 718/1 |
| 2010/0115080 A1* | 5/2010 | Kageyama | 709/223 |
| 2011/0047541 A1* | 2/2011 | Yamaguchi et al. | 718/1 |
| 2011/0170479 A1* | 7/2011 | Chan et al. | 370/328 |
| 2011/0246669 A1* | 10/2011 | Kanada et al. | 709/238 |
| 2011/0307889 A1* | 12/2011 | Moriki et al. | 718/1 |
| 2012/0017114 A1* | 1/2012 | Timashev et al. | 714/15 |
| 2012/0110237 A1* | 5/2012 | Li et al. | 711/6 |
| 2012/0137287 A1* | 5/2012 | Pang et al. | 718/1 |
| 2012/0179817 A1* | 7/2012 | Bade et al. | 709/225 |
| 2012/0192181 A1* | 7/2012 | Gilbert et al. | 718/1 |
| 2012/0233285 A1* | 9/2012 | Suzuki | 709/216 |
| 2012/0300615 A1* | 11/2012 | Kempf et al. | 370/216 |
| 2013/0054761 A1* | 2/2013 | Kempf et al. | 709/220 |
| 2013/0086236 A1* | 4/2013 | Baucke et al. | 709/223 |
| 2013/0198352 A1* | 8/2013 | Kalyanaraman et al. | 709/223 |
| 2013/0219384 A1* | 8/2013 | Srinivasan et al. | 718/1 |
| 2013/0232492 A1* | 9/2013 | Wang | 718/1 |
| 2014/0297597 A1* | 10/2014 | Matsubara et al. | 707/681 |

OTHER PUBLICATIONS

Plummer, D., "An Ethernet Address Resolution Protocol," RFC 0826, Nov. 1982, 10 pages.

Srisuresh, P., "Traditional IP Network Address Translator (Traditional NAT)," RFC 3022, Jan. 2001, 16 pages.

Rekhter, Y., "A Border Gateway Protocol 4 (BGP-4)," RFC 4271, Jan. 2006, 104 pages.

Narten, T., "Neighbor Discovery for IP version 6 (IPv6)," RFC 4861, Sep. 2007, 91 pages.

Narten, T., "Problem Statement for ARMD," draft-ietf-armd-problem-statement-01, Feb. 21, 2012, 16 pages.

Mahalingam, M., "VXLAN: A Framework for Overlaying Virtualized Layer 2 Networks over Layer 3 Networks," draft-mahalingam-dutt-dcops-vxlan-01.txt, Feb. 24, 2012, 20 pages.

Bernardos, C.J., "PMIPv6-based distributed anchoring," draft-bernardos-dmm-distributed-anchoring-00, Mar. 5, 2012, 23 pages.

Lasserre, M., "Framework for DC Network Virtualization," draft-lasserre-nvo3-framework-00.txt, Mar. 5, 2012, 20 pages.

Bernardos, C.J., "PMIPv6-based distributed anchoring," draft-bernardos-dmm-distributed-anchoring-01, Sep. 21, 2012, 24 pages.

Rekhter, Y., "Network-related VM Mobility Issues," draft-ietf-nvo3-vm-mobility-issues-00.txt, Dec. 19, 2012, 11 pages.

Khasnabish, B., "Mobility and Interconnection of Virtual Machines and Virtual Network Elements," draft-khasnabish-vmmi-problems-03.txt, Dec. 30, 2012, 29 pages.

Seite, P., "Distributed Mobility Anchoring," draft-seite-dmm-dma-06.txt, Jan. 9, 2013, 15 pages.

Lasserre, M., "Framework for DC Network Virtualization," draft-ietf-nvo3-framework-02.K Feb. 4, 2013, 25 pages.

Mahalingam, M., "VXLAN: A Framework for Overlaying Virtualized Layer 2 Networks over Layer 3 Networks," draft-mahalingam-dutt-dcops-vxlan-03.txt, Feb. 22, 2013, 22 pages.

Lasserre, M., "Framework for DC Network Virtualization," draft-ietf-nvo3-framework-05.txt, Jan. 20, 2014, 24 pages.

"MAC Bridges and Virtual Bridged Local Area Networks—Amendment XX: Edge Virtual Bridging," IEEE P802.1Qbg/D2.2, Feb. 18, 2012, 187 pages.

* cited by examiner

SYSTEM AND APPARATUS FOR DISTRIBUTED MOBILITY MANAGEMENT BASED NETWORK LAYER VIRTUAL MACHINE MOBILITY PROTOCOL

CROSS-REFERENCE TO RELATED APPLICATIONS

The present application claims priority to U.S. Provisional Patent Application 61/609,110, filed Mar. 9, 2012 by Behcet Sarikaya, and entitled "Virtual Machine Mobility Using Distributed Proxy Mobile IPv6," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Datacenter networks may be used by telecom operators as well as by enterprises. The datacenter networks may be organized as one large network which may be implemented in layer 2 of the Open Systems Interconnection (OSI) model (e.g. the data link layer). In some cases, datacenter networks may be natively limited to a single building. In some cases, a datacenter network may be extended geographically using virtual private network (VPN) technologies, which may result in a larger layer 2 network.

SUMMARY

In one embodiment, the disclosure includes a network element (NE) comprising a hypervisor configured to receive a first virtual machine (VM) from a source hypervisor, and send a first VM mobility registration request to a management node, wherein the first VM mobility registration request comprises a VM identifier associated with the first VM and an internet protocol (IP) address associated with the hypervisor.

In another embodiment, the disclosure includes a management node comprising a binding cache, and a processor, wherein the processor is configured to receive a first VM mobility registration request from a first hypervisor, wherein the first VM mobility registration is associated with a VM, and record VM information from the first VM mobility registration request in an entry of the binding cache.

In another embodiment, the disclosure includes a method comprising moving a VM from a source hypervisor to a destination hypervisor, wherein the destination hypervisor sends a first VM Mobility Registration Request to a management node.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Virtualization may be used in a datacenter to enable a plurality of VMs to run on a single physical computer (e.g. a server.) A server may operate a hypervisor, which may act as a platform for VMs to provide access to shared processor, memory, storage, and/or network resources of the server. Dynamic movement of VMs (e.g. live migration) from one server to another may allow for dynamic load balancing or work distribution, which may be advantageous in a datacenter network. As many datacenter networks are implemented in layer 2, VM mobility may be implemented using layer 2 (e.g. Ethernet) and/or layer 2.5 (e.g. Multiprotocol Label Switching (MPLS)) techniques. A datacenter may be considered layer 2 based if packets are switched inside a server rack and/or bridged among sever racks (e.g. completely in layer 2.) From an IP point of view (e.g. network layer/OSI layer 3) layer 2 networked server nodes may be connected to a single link. Layer 2 based networks make allow for VM mobility, but may not scale well for address resolution protocols, such as Address Resolution Protocol (ARP). No control plane protocol may be available to implement OSI layer 3 (e.g. network layer) based VM mobility.

Disclosed herein is a layer 3 VM mobility protocol and associated architecture. A VM may be created by a hypervisor. The hypervisor may register a newly created VM with a management node by sending a VM mobility registration request. The VM mobility registration request may comprise the VM's media access control (MAC) address, IP address (es) associated with the VM and/or the VM's interface(s), a VM identifier (ID), and a source address associated with the hypervisor. The management node may store the information from the VM mobility registration request as an entry of a binding cache. The source address of the hypervisor may be stored as a proxy-care-of-address (Proxy-COA). The management node may send a VM mobility registration reply indicating whether the request was accepted. At a later time, the hypervisor may act as a source hypervisor and may initiate a move to a destination hypervisor. The destination hypervisor may send a VM mobility registration request to the management node to indicate the move. The management node may update the VM's binding cache entry and save the address of the destination hypervisor as an updated Proxy-COA. The management node may then send a VM mobility registration request to the source hypervisor indicating a successful move. In the event that the VM is in active communication (e.g. a hot VM) and is moved multiple times, the management node may send VM mobility registration requests to all previous source hypervisors. The source hypervisor(s) may route continuing traffic to the destination hypervisor and may send periodic VM mobility registration request messages to the management node to indicate that active communications are ongoing. VM entries at the source hypervisor(s) and/or at the management node may be deleted once communications become inactive at the source hypervisor. Upon initiating operation at the destination hypervisor, the VM may update a domain name system (DNS) server to cause all new traffic to be routed directly to the destination hypervisor. Interior gateway protocols and/or inter-domain routing protocols may also be used to optimize routing for continuing VM traffic. The VM mobility protocols may support IP version six (IPv6) VMs and/or IP version four (IPv4) VMs. Portions of the systems and methods disclosed herein may also be disclosed in Internet Engineering Task Force (IETF) document draft-sarikaya-nvo3-vmm-dmm-pmip-01, IETF document request for comment (RFC) 5213, and/or IETF document RFC 5844 all of which are incorporated by reference as if fully reproduced herein.

Figure 1A:
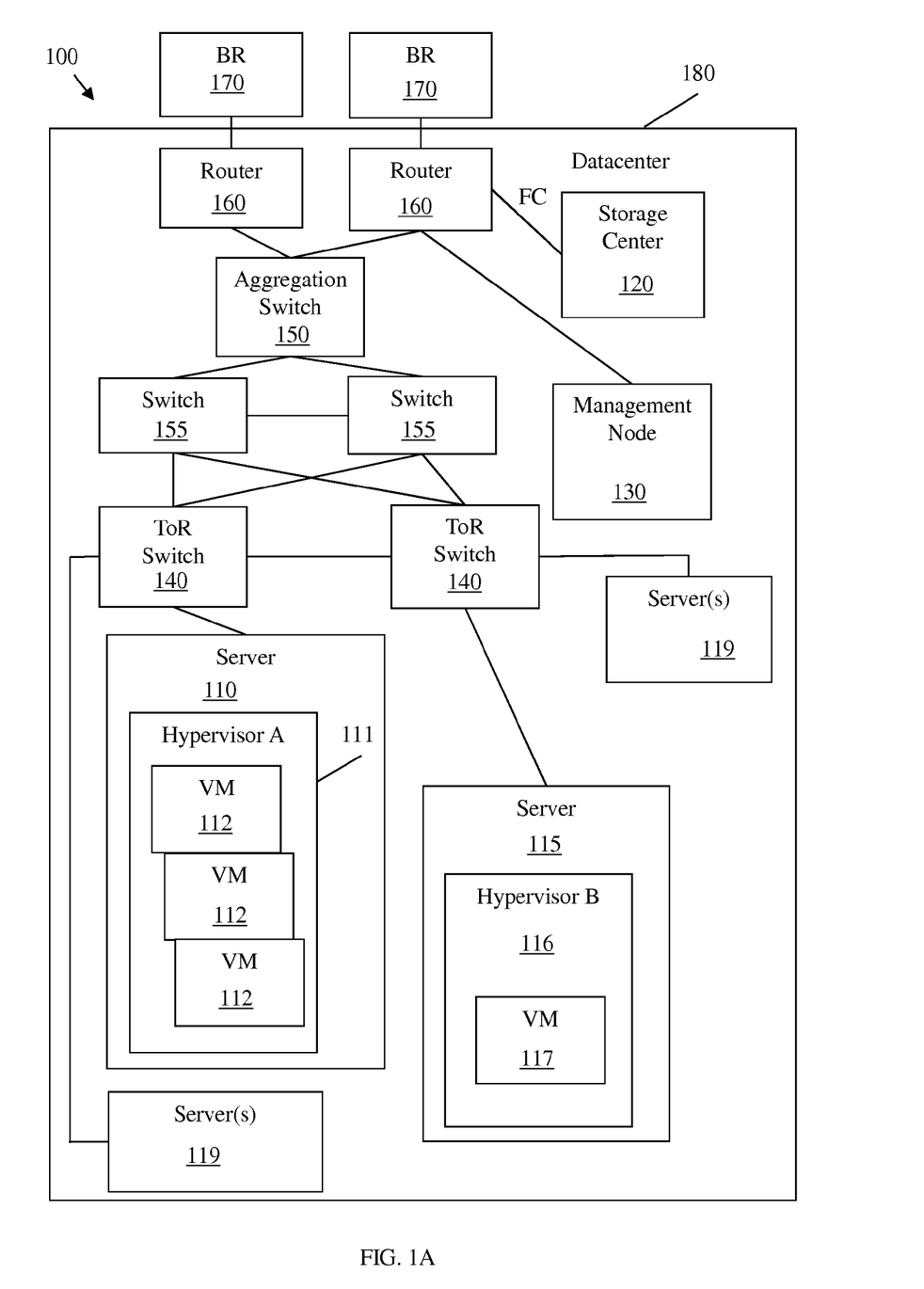
FIG. 1A is a schematic diagram of an embodiment of a datacenter network.

FIG. 1A is a schematic diagram of an embodiment of a datacenter network 100, which may support IPv6 and/or IPv4 VM mobility. Datacenter network 100 may be a layer 3 network configured to support a live VM migration protocol. The data center network 100 may be positioned in a data center 180. The network 100 may comprise servers 110, 115, and/or 119, which may operate hypervisors 111 and/or 116. The hypervisors 111 and/or 116 may create and/or operate VMs 112 and/or 117. The network may also comprise a management node 130, which may be connected to the servers 110, 115, and/or 119 as shown in FIG. 1. The hypervisors 111 and/or 116 may register VMs 112 and/or 117 with the management node 130. The hypervisors 111 and/or 116 may move VMs 112 and/or 117 to other hypervisors and/or servers. The hypervisors 111 and/or 116 may communicate with management node 130 to facilitate the transmission of VMs 112 and/or 117 as well as perform associated host routing of active network traffic to VMs 112 and/or 117.

Datacenter 180 may be a facility used to house computer systems and associated components, such as telecommunications and storage systems. A datacenter 180 may include redundant or backup power supplies, redundant data communications connections, environmental controls (e.g., air conditioning, fire suppression) and security devices. Datacenter 180 may comprise a network 100 to interconnect servers (e.g. servers 110, 115, and/or 119), storage devices (e.g. storage center 120), manage communications, and provide remote hosts and/or local hosts access to datacenter 180 resources (e.g. via border routers 170.) A host may be any device configured to request a service (e.g. a process, storage, etc.) from a server (e.g. servers 110, 116, and/or 119.) A host may be a remote host, which may be positioned outside of the datacenter 180, (e.g. CN 185-187 as discussed below) or a local host, which may be positioned inside the datacenter 180. A host in active communication with a server may be referred to as a correspondent node.

A datacenter 180 may house a plurality of servers, such as servers 110, 115, and/or 119. A server 110, 115, and/or 119 may be any device configured to respond to requests and/or provide services to hosts. A server may provide services via VMs, such as VMs 112 and/or 117. A VM 112 and/or 117 may be a simulation and/or emulation of a physical machine that may be configured to respond to requests in a predetermined manner. For example, VMs 112 may run a single program and/or process and VM 117 may act as a system platform such as an operating system (OS). VM 112 and/or 117 may receive requests from hosts, provide data storage and/or retrieval, execute processes, and/or transmit data (e.g. process results) to the hosts. VMs 112 and/or 117 may be managed by hypervisors 111 and/or 116. A VM may comprise a plurality of virtual interfaces, which may be supported by a hypervisor and may be used to communicate with hosts. IP address(es) may be associated with a VM, a VM interface, and/or a plurality of a VM's interfaces. A VM may be referred to as a hot VM when the VM is actively engaged in communicating with a host at a specified time. A VM may be referred to as a cold VM when the VM is not engaged in host communication.

A hypervisor 111 and/or 116 may be a hardware, software, and/or firmware VM management entity, which may operate on a server 110, 115, and/or 119, and may act as a virtual operating platform to a VM (e.g. VMs 112 and/or 117.) The hypervisor 111 and/or 116 may create, manage, and transfer VMs to other hypervisor(s). VM mobility may be the transfer of VMs between hypervisors and/or servers. The hypervisor 111 and/or 116 may comprise a binding update list, which may be employed for VM mobility. The binding update list may comprise data relating to VMs operating on the hypervisor as well as maintain data relating to hot VMs that have been sent to another hypervisor. For example, hypervisor 111 may create and manage VMs 112. In the event that server's 110 resources are needed for other processes, hypervisor 111 may transmit some or all of VMs 112 to hypervisor 116, in which case hypervisor 116 may employ resources from server 115 to operate VM(s) 112. If a VM 112 is a hot VM, hypervisor 111 may maintain data relating to VM 112 in the binding update list at hypervisor 111. When communications are received by hypervisor 111 for VM 112, the hypervisor 111 may use to binding update list to determine the location of VM 112 and forward the communications to VM 112, for example using host routing.

Servers 110, 115, and/or 119 may be positioned in racks. Each rack may comprise a top-of-rack (ToR) switch 140, which may be a switch used to connect the servers in a datacenter 180 to the datacenter network 100. The ToR switches 140 may be connected to each server in a rack as well as to other ToR switches 140 to allow communication between racks. Racks may be positioned in rows. The ToR switches 140 may be connected to other switches 115, such as end-of-row (EoR) switches, which may allow communication between rows. Switches 115 may be connected to an aggregation switch 150. The aggregation switch 150 may aggregate communications between the servers for interaction with the datacenter's 180 core network. The aggregation switch 150 may be connected to routers 160, which may be positioned inside the datacenter 180 core network. Communications may enter and leave the data center 180 via border routers (BR) 170. A BR may be positioned at the border of the network 100 and may provide connectivity between VMs and remote hosts communicating with the VMs (e.g. via the Internet.)

The data center 180 may comprise a storage center 120. The storage center 120 may comprise a plurality of storage devices configured to store and retrieve data based on commands from the servers 110, 115, and/or 119, VMs 112 and/or 117, hypervisors 111 and/or 116, and/or hosts. The storage center 120 may be connected to the data center 180 (e.g. via router 160) using a high speed connection such as an optical fiber channel (fc).

The data center 180 may also comprise a management node 130. The management node 130 may store data related to the VM mobility and may assist and/or manage VM mobility in conjunction with the hypervisors 111 and/or 116. The management node 130 may comprise a binding cache, which may comprise a binding cache entry for each VM in the data center 180 and/or VMs that have been moved outside of the datacenter (e.g. moved to another hypervisor in another datacenter.) The binding cache may comprise the IP address of a VM and/or of VMs active interfaces, a media access control (MAC) address of the VM, a VM identifier, and/or a Proxy-COA for a VM. The management node 130 may track VM movement as discussed herein, save related VM data in the cache, and alert associated hypervisors of the VM movement for data forwarding purposes.

A hypervisor that supports distributed virtual machine mobility as discussed herein may be called a mHypervisor, or mHS. For VMs that are created locally (e.g. by a local hypervisor such as hypervisor 111) and have not moved, mHS may act as a serving and/or destination mHS. After a VM moves to a new mHypervisor, the previous mHS may be referred to as an anchor or source mHS. When a VM is created, the VM and/or creating hypervisor may register data associated with the VM with the data center management system (e.g. management node 130.) The management node 130 may keep a record of all data center VMs and the most recent addresses (e.g. IP addresses) of such VMs. The management node 130 may manage all intra and inter datacenter VM mobility. Intra datacenter VM mobility and inter datacenter VM mobility may be movement inside data center 180 and movement between a server in data center 180 and another data center, respectively.

After a VM is created (e.g. VMs 112 and/or 117), the VM may start to serve its users (e.g. hosts). A VM may be moved at any time during the process of serving such users. Live VM migration (e.g. mobility) may be performed by the hypervisor (s). A VM may move from a source hypervisor (e.g. anchor mHS) to a destination hypervisor (serving mHS). If VM moves to a different subnet, the IP address(es) associated with the VM and/or VM interfaces may change. For example, if a VM moves from hypervisor 111 to hypervisor 116, hypervisor 111 may be the source hypervisor and hypervisor 116 may be the destination hypervisor. Moving from hypervisor 111 to hypervisor 116 may result in IP address changes for a VM 112.

As discussed in more detail below, a VM, such as VM 112, may be registered with the management node 130 when the VM is created, for example at a source hypervisor 111. The source hypervisor 111 may send a VM 112 to a destination hypervisor 116. The destination hypervisor 116 may inform the management node 130 of the movement. The management node 130 may then notify the source hypervisor 111 of the movement. In case a VM makes multiple moves in succession, the management node 130 may notify all past source hypervisors receiving active communications to allow all active communications to be forwarded to the destination hypervisor.

VMs 112 and/or 117 may not be involved in mobility signaling. Once a VM moves to a destination hypervisor, the VM 112 and/or 117 may continue to receive packets sent to the VM's previous address(es) (e.g. in a hot VM mobility scenario.) The VM 112 and/or 117 may establish virtual interfaces for each of its previous addresses. The virtual interfaces may be established only if there is communication on an address previously acquired, in which case the previously acquired address may be assigned to the virtual interface. The virtual interfaces may enable the VM 112 and/or 117 to continue to receive packets from the VM's previous addresses. Virtual interfaces may be deleted when there are no further communications received via the associated address.

Figure 1B:
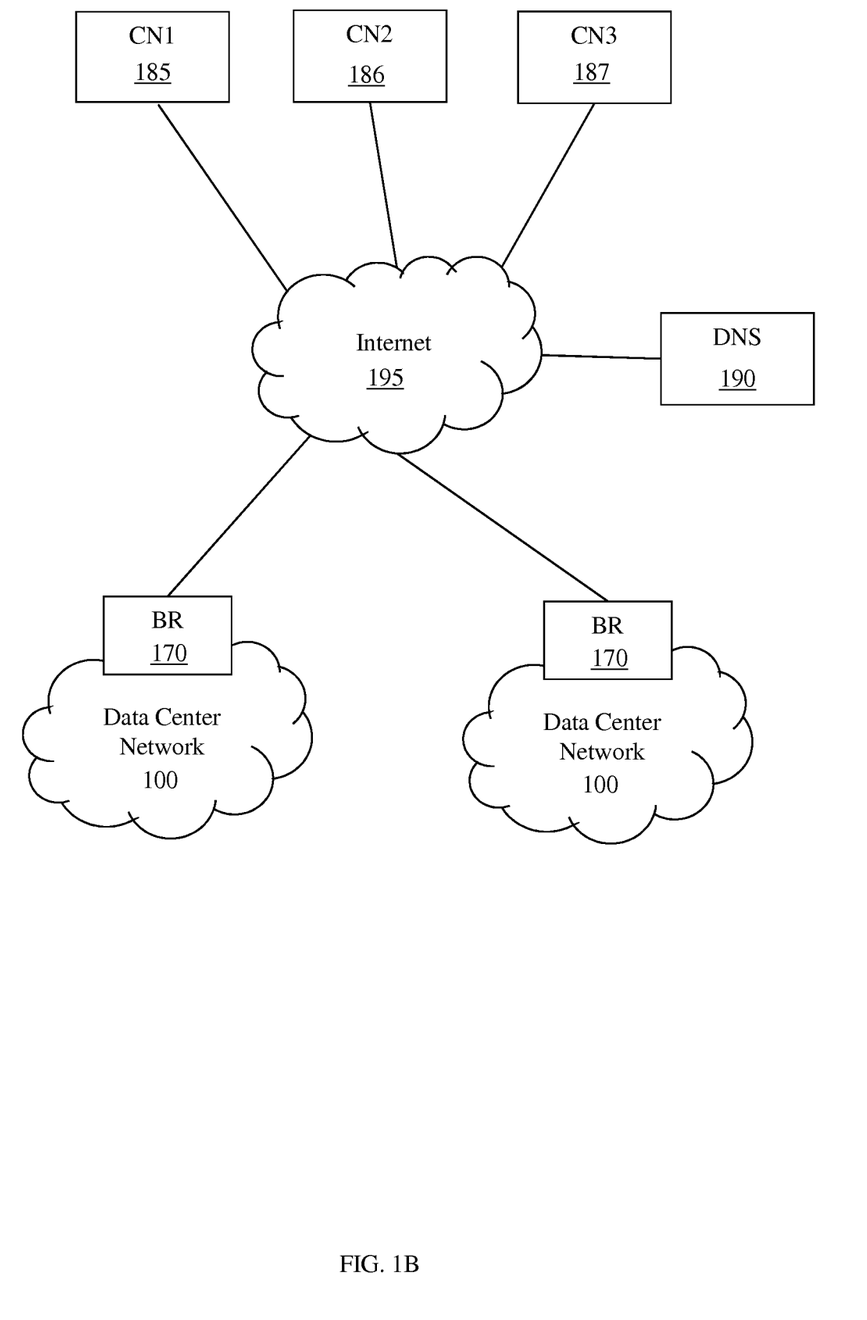
FIG. 1B is a schematic diagram of an embodiment of a datacenter network connecting to hosts via the Internet.

FIG. 1B is a schematic diagram of an embodiment of a datacenter network 100 connecting to hosts via the Internet 195. As discussed with reference to FIG. 1A, a datacenter network 100 may connect to remote hosts via the Internet 195. A remote host that is actively communicating with a VM (e.g. VM 112) may be referred to as a correspondent node (CN). A first CN (CN1) 185, a second CN (CN2) 186, and/or third CN (CN3) 187 may connect to data center network 100 via the network's 100 border routers 170. VM 112 and/or 117 may communicate with a DNS server 190 to register a VM domain name and VM IP address(es). CNs 185-187 may be aware of VM domain name(s), may query the DNS server 190 to obtain the associated IP address(es) and may communicate directly with the VM at the data center network 100 associated with the VM IP addresses. If a VM (e.g. VM 112 and/or 117) moves from one data center network 100 to another data center network 100 and/or within the same subnet, the VM may update the DNS server 190 with IP addresses associated with the VM. CNs 185-187 may contact the DNS 190 prior to beginning communications with the associated VM (e.g. the cold VM scenario), determine the current IP address(es) of the VM, and transmit messages to the VM at the current datacenter network 100 and/or subnet by using the current IP address(es.)

Figure 2:
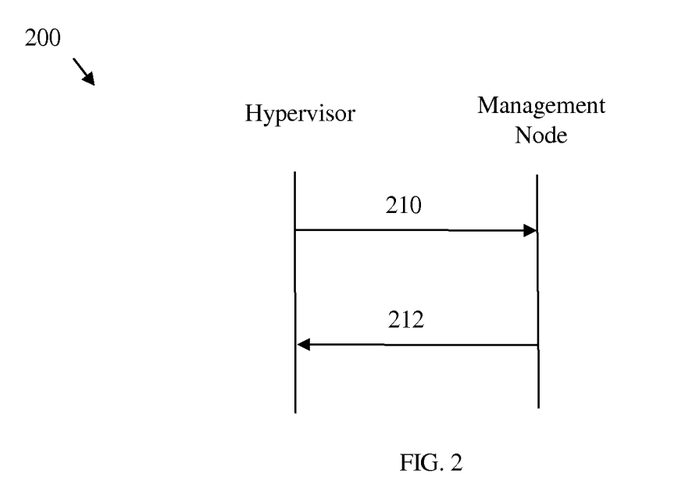
FIG. 2 is a protocol diagram of an embodiment of a method of VM mobility registration.

FIG. 2 is a protocol diagram of an embodiment of a method 200 of VM mobility registration. When a VM is created (e.g. VM 112), the VM's hypervisor (e.g. hypervisor 111) may act as a source hypervisor. At step 210, the hypervisor may send a VM Mobility Registration Request to a management node, such as management node 130. The VM Mobility Registration Request may comprise the VM's MAC address, a VM identifier (ID), and/or IP address(es) associated with the VM and/or the VM's interfaces. Upon receiving the VM Mobility Registration Request at step 210, the management node may create an entry for the VM in the management node's binding cache and record the VM information from the request in a binding cache entry. The management node may also obtain the source address of the VM Registration Request packet and record the source address in the binding cache entry as a Proxy-CoA for the VM. At step 212, the management node may send a VM Mobility Registration Reply message to the hypervisor. The VM Registration Reply message may comprise a status field, which may be set indicate whether the VM Mobility Registration Request from step 210 has been accepted or rejected.

Figure 3:
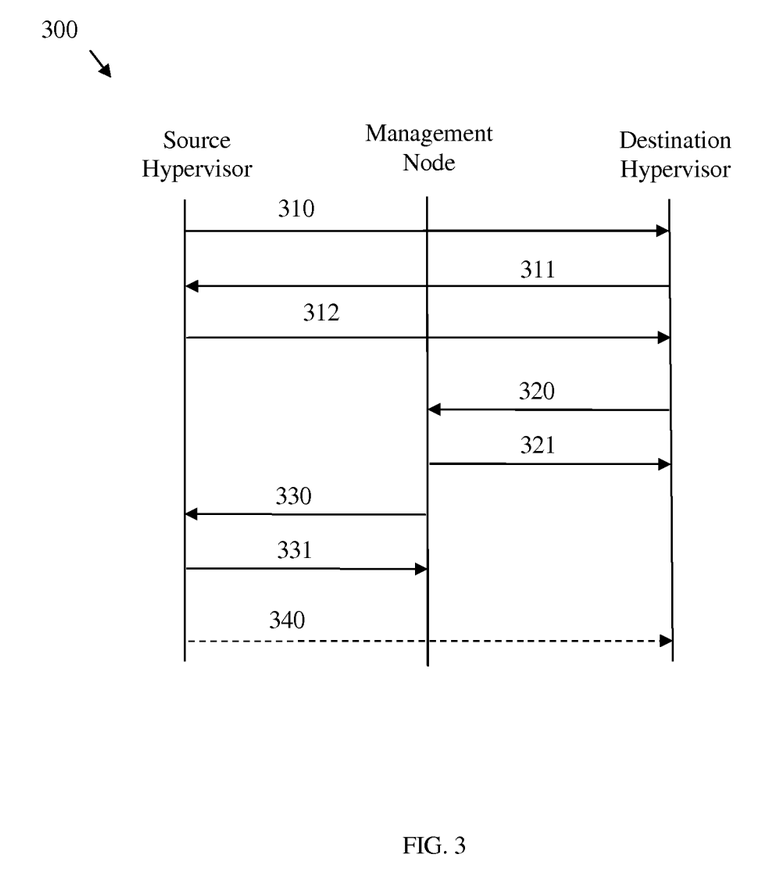
FIG. 3 is a protocol diagram of an embodiment of a method of VM mobility signaling.

FIG. 3 is a protocol diagram of an embodiment of a method 300 of VM mobility signaling. Method 300 may be employed to move a VM (e.g. VM 112) that has already been created and registered with a management node (e.g. management node 130) via method 200. At step 310, a source hypervisor, such as hypervisor 111, may initiate a VM move to a destination hypervisor, such as hypervisor 116 by sending a VM Mobility Registration Request message to the destination hypervisor. At step 311, the destination hypervisor may send a VM Registration Reply message to the source hypervisor indicating that the request of step 310 has been accepted. After VM mobility related signaling (e.g. VM Mobility Registration Request/Reply of steps 310-311), the VM state may be transferred to the destination Hypervisor. The state may include the VMs memory and file system. At step 312, the source hypervisor may transfer the VM to the destination hypervisor, for example by opening a Transmission Control Protocol (TCP) connection with destination hypervisor over which VM's memory state may be transferred. A file system and/or local storage of the VM may also be transferred at step 312. The transfer may ensure consistency so that the VM at the destination may access the same file system it had access to at the source hypervisor. For example, precopying may be used to transfer the VM file system. The VMs disk image may be transferred while VM continues to run. After the VM is moved, any changes in the VM file system may be packaged together and sent to the destination hypervisor, which may reflect the changes to the file system locally at the destination. If the move at step 312 is not in the same L2 link, the VM IP address(es) may change. The VM may obtain new IP address from the destination Hypervisor as needed.

At step 320 the destination hypervisor may send a VM Mobility Registration Request message to the management node to indicate that the VM has been moved from the source hypervisor to the destination hypervisor. The management node may receive the VM Mobility Registration Request message and may search the binding cache for a matching entry using the VM's ID. Once a match is found, the cache entry may be modified to point to the new IP address(es) obtained at step 312 and a new Proxy-CoA comprising the IP address of the destination hypervisor. Any previous Proxy-CoAs may kept in the entry, such as the Proxy-CoA associated with the source hypervisor. At step 321, the management node may send a VM Mobility Registration Reply to the destination Hypervisor to indicate the acceptance of the registration.

The source hypervisor and/or any previous source hypervisor, as discussed with respect to FIG. 4 below, may be informed of the new IP address(es) of the VM. For this purpose, at step 330 the management node may send a VM Mobility Registration Request message to the source hypervisor(s). The source hypervisor(s) may verify that the message of step 330 is received from the management node, and may reject any message not sent from the management node. At step 331, the source hypervisor may send a VM Mobility Registration Reply back to the management node. At step 340, the source hypervisor may create a host route pointing the VM address at the source hypervisor to the VM address at the destination hypervisor. The VM address at the source hypervisor may be obtained from the Binding Update List entry matching the VM ID and the VM address at the destination hypervisor may be obtained from VM Mobility Registration Request message received from the management node at step 316. The host route created at step 340 may be employed to route continuing communications from VM hosts to the VM at the destination hypervisor. It should be noted that the dashed arrow of step 340 may denote a data path, while the solid arrows of FIG. 3 may denote control plane signaling.

It should be noted that in an alternate embodiment, the VM transfer of step 312 may occur after step 331 and prior to step 340 to allow complete mobility signaling to take place between the source hypervisor, the management node, and the destination hypervisor to take place before the VM transfer. In yet another embodiment, the VM transfer may occur at step 312 and the VM may operate simultaneously at the source hypervisor and the destination hypervisor while steps 320-321 and 330-331 are completed. The source hypervisor may then cease VM operation and transmit any VM state and/or data changes to the destination hypervisor between steps 331 and 340. The destination hypervisor may incorporate such changes to the VM at the destination hypervisor to allow for a seamless transition.

Figure 4:
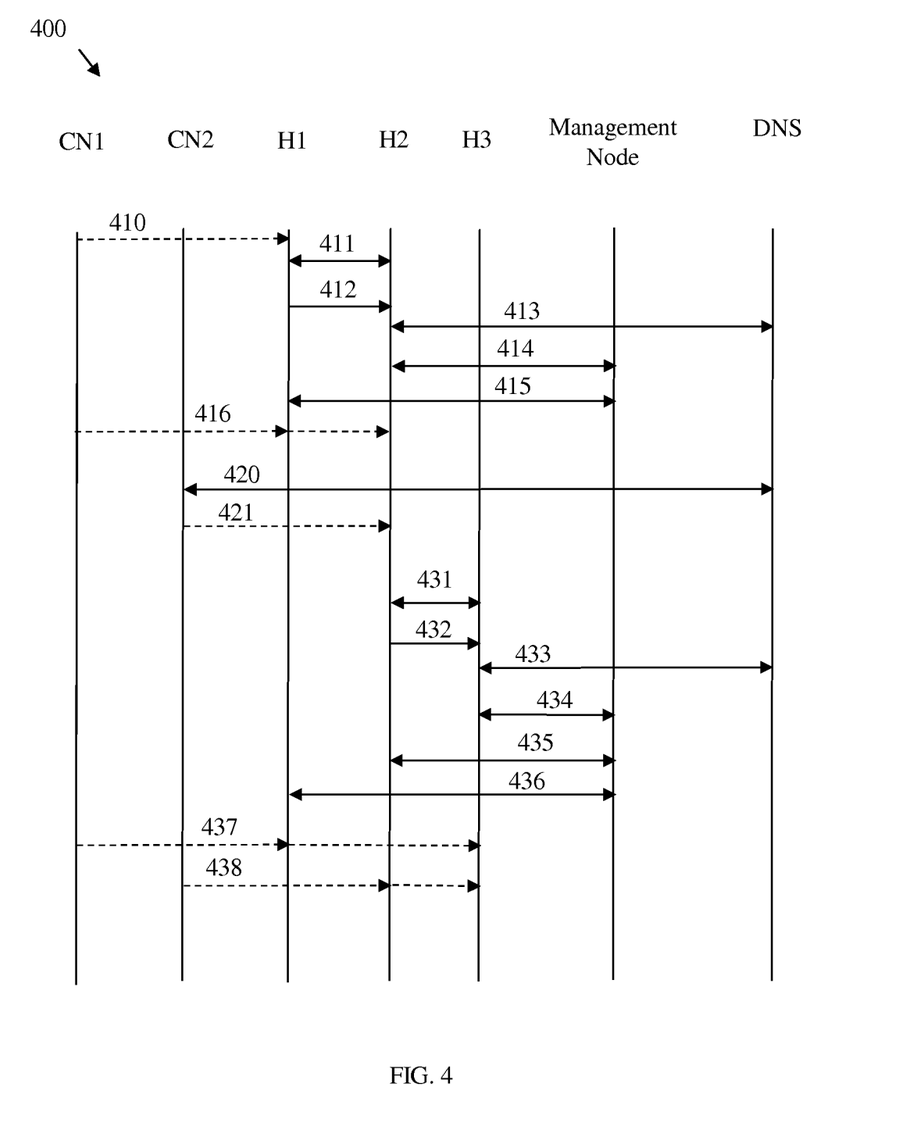
FIG. 4 is a protocol diagram of another embodiment of a method of VM mobility signaling.

FIG. 4 is a protocol diagram of another embodiment of a method 400 of VM mobility signaling. Method 400 may be substantially similar to method 300, but may also illustrate signaling with correspondent nodes, DNS server, and multiple moves by a single VM. As such, method 400 may be a more complex embodiment than method 300, but may employ substantially the same protocol. As with method 400, dashed arrows may illustrate a data path and solid arrows may illustrate control plane signaling.

Prior to step 410, a VM, such as VM 112, may be positioned on a first hypervisor (H1), such as hypervisor 111, which may be positioned on a server such as server 110. At step 410, a CN1, such as CN1 185, may begin transmitting data to the VM at a H1. At step 411, H1 may determine to move VM to a second hypervisor (H2), such as hypervisor 116. H1 may perform a VM registration exchange with H2 at step 411. A VM registration exchange may comprise a VM Mobility Registration Request and a VM Mobility Registration Reply, which may be substantially similar to steps 310-311. At step 412, H1 may send the VM to H2 in substantially the same manner as step 312. At step 413, the destination hypervisor of the VM may dynamically update a DNS server, such as DNS server 190. The update of step 413 may register all services that the VM provides, which may allow all traffic from new connections to be directed to the VM location at H2 (e.g. at server 115) and may not require tunneling and/or triangular routing. A dynamic DNS update may solve the cold VM mobility problem since all new communication to the VM may be initiated at the new address(es) that VM acquired at the destination hypervisor H2. Cold VM mobility may also allow all source hypervisors to delete binding update list entries of the VM upon receiving a VM Mobility Registration Request as communication forwarding may not be needed (e.g. at step 415 in the case that communications have ceased with CN1.)

At step 414, H2 may perform a VM registration exchange with the management node (e.g. management node 130) in a substantially similar manner to steps 320-321. At step 415, the management node may perform a VM registration exchange with H1 in a substantially similar manner to steps 330-331. At step 416, H1 may setup host routing, in substantially the same manner as step 340. H1 may continue to receive communications for the VM from CN1, and at step 416 H1 may forward such communications to H2 for delivery to the VM.

At step 420, a CN2, such as CN2 186, may wish to communicate with the VM. CN2 may perform a DNS exchange with the DNS server to obtain the current location of the VM based on the DNS update at step 413. Using the IP address of the VM and/or VM interface at H2, CN2 may transmit data to the VM at step 421 without routing such communications via H1.

At step 431, the second hypervisor may determine to move the VM to a third hypervisor (H3), such as a hypervisor positioned on a server 119. H2 may signal and transfer the VM to H3 at steps 431-432 in substantially the same manner as in steps 411-412. H3 may update the DNS server and signal the management node at steps 433-434 in substantially the same manner as 413-414. The binding established at steps 414-415 may continue to be active due to communications from CN1. As such, the management node may use the address of H3 as the Proxy-COA for the VM and may retain the previous Proxy-COAs (e.g. addresses for H1 and H2, respectively) in the VM cache entry. Based on the cache entry, the management node may perform a VM registration exchange with both H2 and H1 at steps 435 and 436, respectively. At step 437, the communication with CN1 may remain active. As such, at step 437, H1 may receive communications from CN1 and forward the communications to H3 based on the binding update list at H1. H2 may also receive communications for the VM from CN2 at step 438. H2 may forward the communications from CN2 to H3 based on the binding update list at H2.

As shown above, as long as communications remain active, the hypervisors may continue to forward such communications according to the binding update list. The VM Mobility Registration Request messages discussed herein may contain a Lifetime field, which may comprise a 16-bit unsigned integer. The lifetime field may comprise the lifetime of the registration in a number of time units, each of which may be about 4 seconds. The source hypervisor (e.g. H1) may send a suggested lifetime value (e.g. at step 411) and the management node may reply with the final value of the lifetime (e.g. at step 415.) The final value may be equal or less than the suggested value. In order to extend a binding that is expiring (e.g. due to continued communications from CN1), a source hypervisor (e.g. H1) may send periodic VM Mobility Registration Requests to the management node.

Each source hypervisor (e.g. H1 and H2) may keep an entry in their Binding Update List for each VM that was in communication with a CN before such VM was moved (e.g. VMs in hot VM mobility.) The entries for VMs in cold VM mobility may be removed after receiving a VM Mobility Registration Request message from the management node, for example at steps 414, 435, and/or 436 in the event that CN1 and/or CN2 discontinue communications with the VM. The Binding Update List may be used to create host routes, such as in steps 416, 437, and/or 438. A source hypervisor may send all packets from ongoing connections of the VM to the destination hypervisor using the host route(s). The destination hypervisor may receive the forwarded packets and send them to the VM. The delivery mechanism discussed herein may avoid tunneling. At the source hypervisor (e.g. H1 and H2), VM entries may be kept in the binding update list until all inbound traffic to the VM stops. A timer may be used for this purpose. When the timer times out, the entry may be deleted.

When a VM in motion has ongoing communications with outside hosts (e.g. CN1, and/or CN2) the packets may continue to be received at the source hypervisors. Source hypervisors may create host routes based on the binding update list entries they have for the VM. Source routing may enable the source hypervisors to route ongoing communications to the destination hypervisor. If the VM is moved to a different data center, the packets are routed to the new data center.

Figure 5:
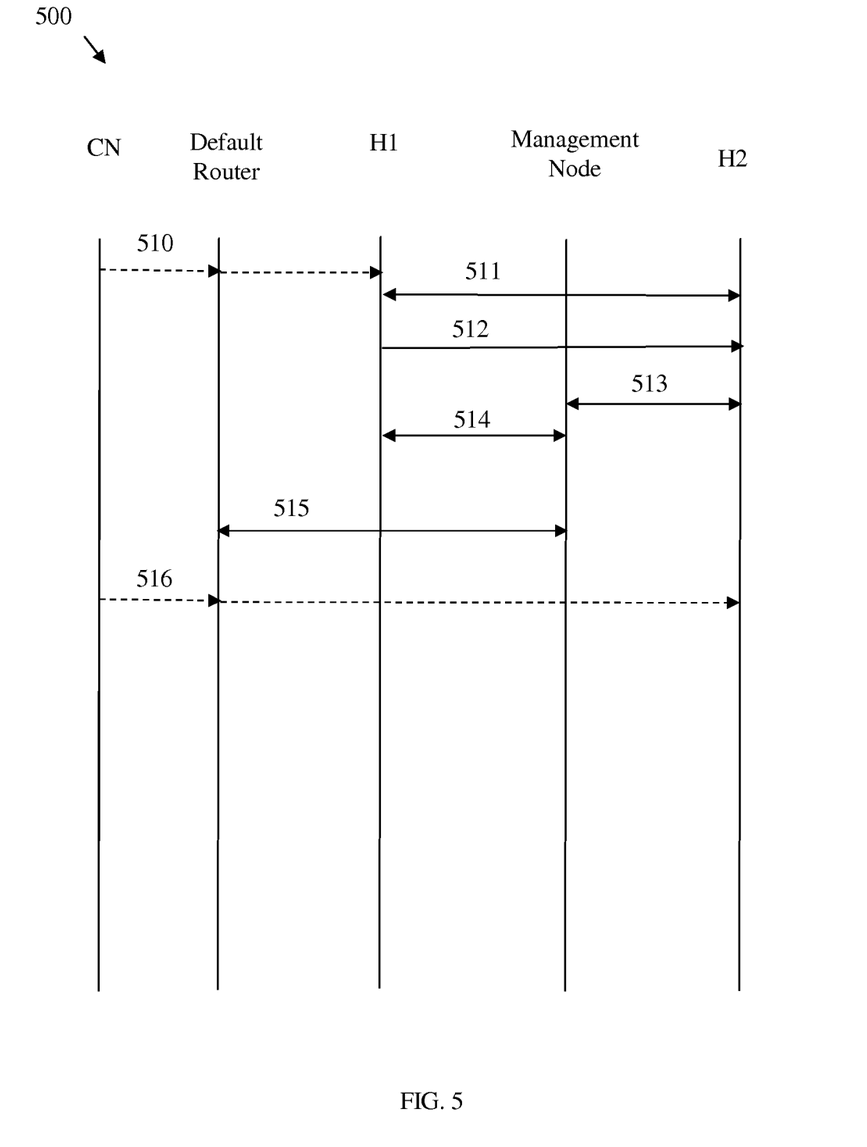
FIG. 5 is a protocol diagram of an embodiment of a method of VM mobility signaling with intra-datacenter routing optimization.

FIG. 5 is a protocol diagram of an embodiment of a method 500 of VM mobility signaling with intra-datacenter routing optimization. Method 500 may be employed to optimize the routing in methods 300 and/or 400 in the case where the source hypervisor and the destination hypervisor are positioned in the same data center (e.g. hypervisor 111 and hypervisor 116, respectively.), which may be an intra-datacenter move. Route optimization may be employed to avoid triangular routing. In mobility protocols, route optimization may be achieved by establishing a direct route between all communicating hosts, such as correspondent nodes and the destination VM. Optimal IP routing in VM mobility may involve outgoing traffic and incoming traffic. Optimal IP routing for the outgoing traffic may be achieved by assigning a default router that is topologically closest to the ToR switch, such as ToR Switch 140, that connects to the server presently hosting that VM. Optimal IP routing may be achieved by limiting the size of the layer 2 network to the size of a server rack and selecting the ToR switch to act as the default gateway of all the servers connected to the ToR switch. Optimal IP routing of the incoming intra data center traffic may be achieved according to method 500.

At step 510, a CN, such as CN1 185, may send data to H1 (e.g. hypervisor 116) via the default router (e.g. ToR switch 140.) At steps 511-512, H1 may move the VM (e.g. VM 117) in substantially the same manner as steps 411-412. H2 (e.g. hypervisor 116) may perform a VM registration exchange with the management node (e.g. management node 130) at step 513, which may perform a VM registration exchange with H1 at step 514 in substantially the same manner as steps 414-415. At step 515, the management node may also exchange VM Mobility Registration Request/Reply messages with the default router of the source hypervisor. The default router may be the ToR switch (e.g. ToR switch 140 in data center 180), but may also be a different data center node depending on the configuration of the data center. The default router may maintain a binding update list and interpret VM address to pairs to determine an optimized host route for the VM. The default router may establish the host route at step 516 and use the host route to redirect traffic from any CN1 or from VMs in the servers connected to the default router. In this manner, communications may be forwarded directly from the default router to H2 (and/or a default router of H2) instead of passing through the default router to H1, and being routed back through the default router from H1 toward H2 (e.g. triangular routing.) The default router may allow configuration of the host route generated by the VM Mobility Registration methods discussed herein. According to method 500, a VM may not be moved until an Interior Gateway Protocol (IGP), such as Open Shortest Path First (OSPF) or Intermediate System to Intermediate System (IS-IS), announces a route to the default router of the destination hypervisor. The VM may wait to move until the host route is set-up. The VM Mobility Registration protocol may be used to inform both default routers that method 500 is being employed.

Figure 6:
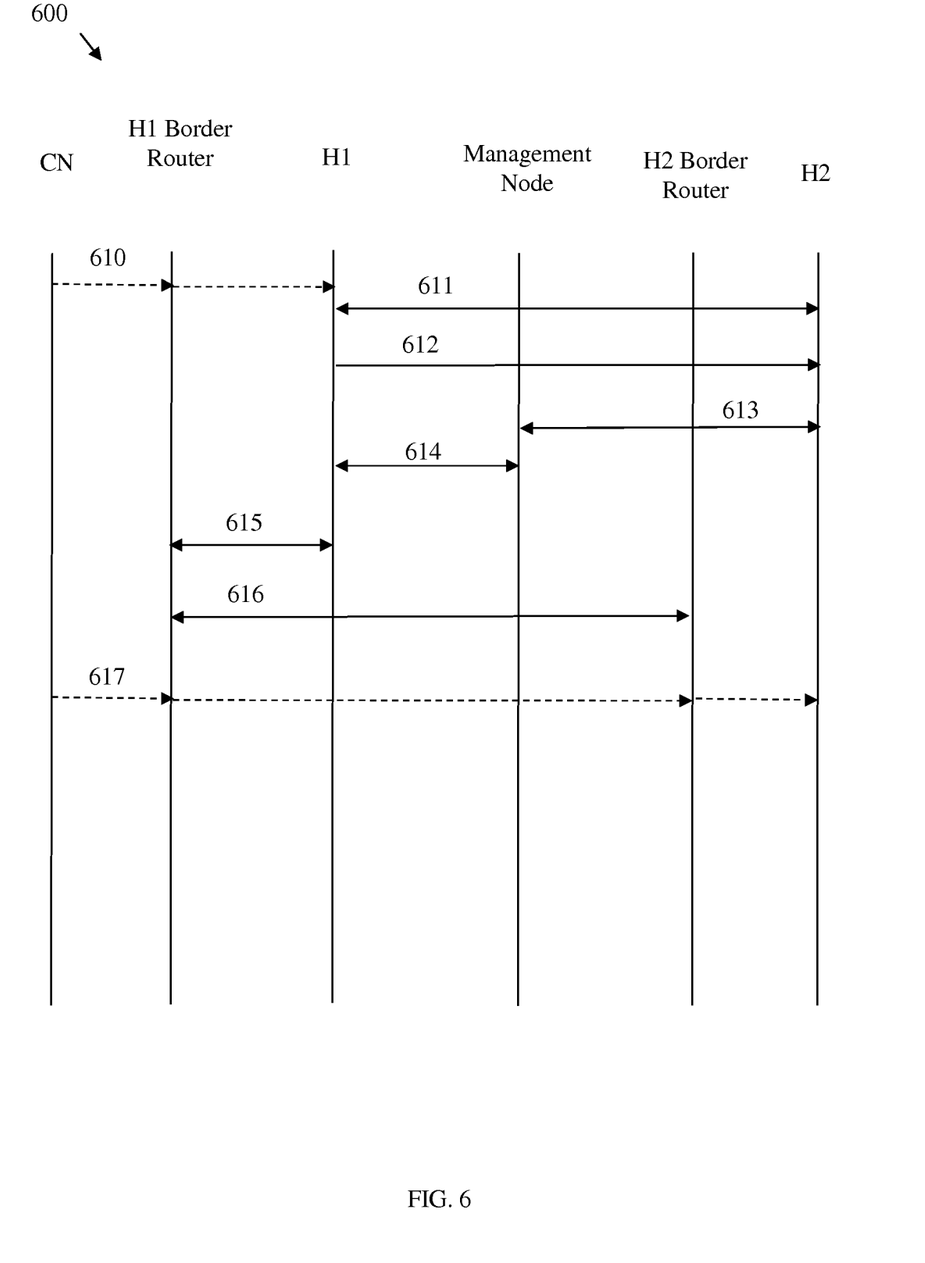
FIG. 6 is a protocol diagram of an embodiment of a method of VM mobility signaling with inter-datacenter routing optimization.

FIG. 6 is a protocol diagram of an embodiment of a method 600 of VM mobility signaling with inter-datacenter routing optimization. Method 600 may be similar to method 500, but may be employed when a source hypervisor (e.g. hypervisor 111) is positioned in a different datacenter network than the destination hypervisor. Steps 610-614 may be substantially similar to steps 510-514, except the messages may pass between data centers via the H1 border router and the H2 border router.

Optimal IP routing of incoming inter-datacenter traffic may be achieved by propagating the host routes using inter-domain routing protocols such as a Border Gateway Protocol (BGP). If a host route is propagated within a datacenter using IGPs, the IGP redistribution mechanism may by policy redistribute the host routes to the data center Border router (e.g. BR 170.) A BGP community may be tagged to the host routes for ease of processing. H1 may receive incoming traffic for a VM that has moved and may try to reroute the traffic using host routes, which may be impossible in the inter-datacenter case. H1 may then inform the H1 border router to initiate a BGP update message at step 615. H1, acting as the source hypervisor, may inform the H1 BR of each host route that it has in its binding update list for the VM.

At step 616, H1 Border router may generate an update message using the information it received from H1 at step 615. The update message may comprise a VM address and/or host route information received via an IGP message. The address prefix values in IPv4 and/or IPv6 of the VM when positioned at the source hypervisor and the destination prefix may each be contained in a Network Layer Reachability Information (NLRI) field of the update message. H1 BR may send the BGP update message to its BGP peers at step 616. The update message with host routes may be exchanged among a particular set of data centers, possibly the data centers belonging to the same operator. Such constrained propagation may be achieved by policy enforcement. At step 617, H1 BR may receive communications from CN1 and forward the communications to H2 via H2 BE without transmitting such communications through H1.

Figure 7:
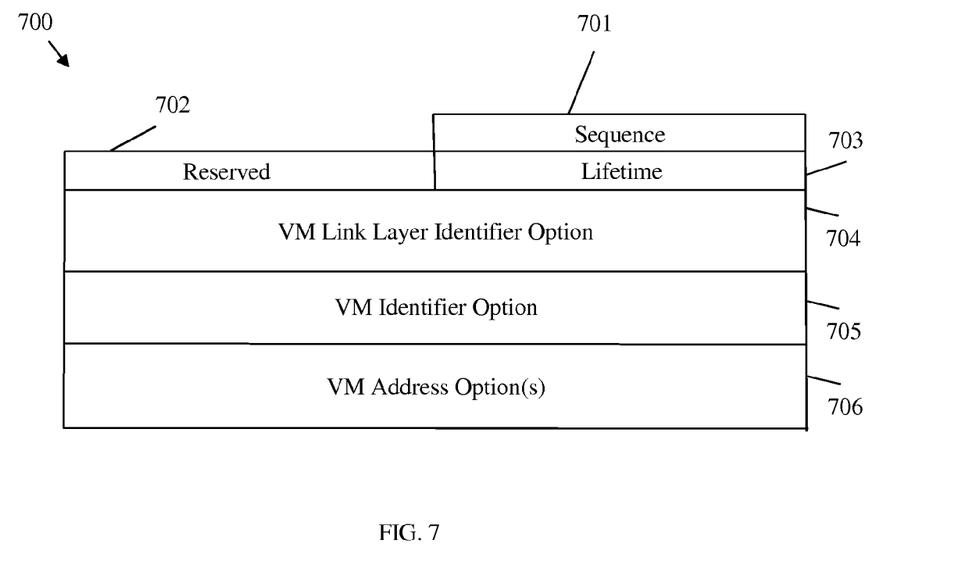
FIG. 7 is a schematic diagram of an embodiment of a VM mobility registration request message encoding.

FIG. 7 is a schematic diagram of an embodiment of a VM Mobility Registration Request message 700 encoding. As discussed above, a VM Mobility Registration Request 700 may be used to register a VM with a management node and/or notify nodes of VM mobility (e.g. in step 210, step 320, step 411, etc.) A VM Mobility Registration Request 700 may comprise an IPv6 extension header containing the fields of length, type, checksum, sequence number 701, reserved 702, lifetime 703, and the message data 704-706. The sequence number field 701 may comprise a sequence number, which may be used to match the Request 700 with an associated VM Mobility Registration Reply 800 in a VM mobility registration exchange. The lifetime field 703 may comprise a requested lifetime of a mobility binding. The lifetime may be indicated in a number of time units, each of which may be about 4 seconds. The message data 704-706 may comprise various options which may be structured in Type Length Value (TLV) format. The VM Mobility Registration Request 700 message may comprise a VM Link Layer Identifier option 704 in which Link-Layer Identifier is a MAC address of the VM, VM Identifier option 705 containing VM-ID, and/or VM Address option(s) 706 containing VM address (es). More than one Virtual Machine Address option 706 may be included, possibly one for each interface of the associated VM. A source address of VM Mobility Registration Request 700 may be used as Proxy Care-of Address (Proxy-CoA) for the associated VM. A source hypervisor (e.g. hypervisor 111 and/or 116) may maintain these values for each VM in a data structure called Binding Update List with one entry allocated for each VM.

Figure 8:
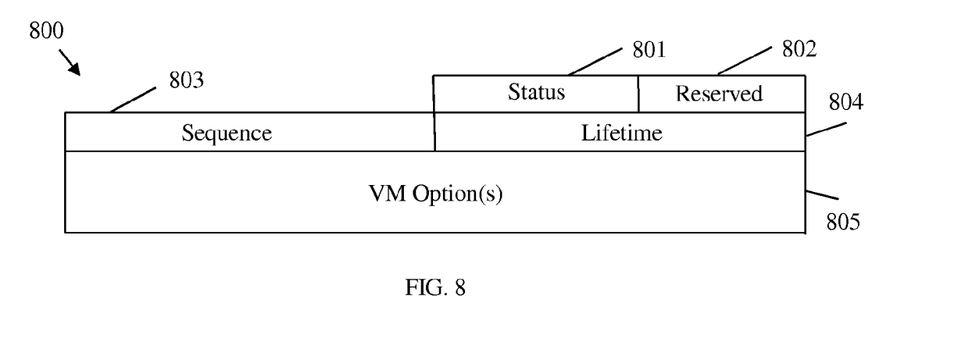
FIG. 8 is a schematic diagram of an embodiment of a VM mobility registration reply message encoding.

FIG. 8 is a schematic diagram of an embodiment of a VM Mobility Registration Reply message 800 encoding. As discussed above, a VM Mobility Registration Reply 800 may be used to accept and/or reject a VM Mobility Registration Request 700 (e.g. in step 212, step 321, step 411, etc.). A VM Mobility Registration Reply 800 may comprise a status field 801, a sequence field 803, a lifetime field 804, and a VM option(s) field 805. The status field 801 may be set to indicate an associated VM Mobility Registration Request 700 has been accepted or rejected. The sequence number field 803 may comprise a sequence number, which may be used to match the Reply 800 with a particular Request 700. The lifetime field 804 may comprise a lifetime of a mobility binding related to the reply. The lifetime may be indicated in a number of time units, each of which may be about 4 seconds. The lifetime as encoded in lifetime field 804 may be considered a final lifetime if the reply 800 is sent from a management node. The VM option(s) field 805 may comprise options that comprise information related to the VM to which the reply 800 pertains (e.g. VM Link Layer Identifier option 704, VM Identifier option 705, VM Address option(s) 706, etc.)

While the embodiments discussed above may be applicable to devices using IPv6, VMs may be created to serve legacy clients and therefore may be assigned IPv4 addresses. In the case of IPv4 VMs, a source hypervisor may register the VM with the management node (e.g. via methods 200, 300, 400, 500, and/or 600) by sending VM Registration request message 700 comprising a VM IPv4 Address option instead of VM Address option 706 (which may be configured for IPv6.) The VM IPv4 Address option may comprise the IPv4 address of the VM.

The source hypervisor may also include a VM Default Router Address option in the VM Registration request message 700. The VM Default Router Address option may comprise the source hypervisor's IPv4 address. The source hypervisor may be a dual stack device, may support both IPv4 and IPv6, and may send the VM Registration Request message in IPv6 format, which may also include the IPv6 address of the source hypervisor.

The Management node may reply with a VM Registration Reply 800 message after registering IPv4 address in the binding cache. In the reply 800, the VM IPv4 Address option may not be included in VM Option(s) field 805 because the VM may receive the assigned IPv4 addresses from the VM's hypervisor (e.g. not the management node.) The request 700 and/or reply 800 may comprise a lifetime value as in IPv6. The management node may record the VM information in a binding cache entry for the VM with the VM Default Router Address (e.g. the hypervisor IPv4 address) as Proxy-CoA. Any traffic tunneled to the VM may be directed to the Proxy-CoA.

When an IPv4 VM moves to a destination hypervisor, the destination hypervisor may register the VM with the management node as discussed herein (e.g. in methods 300, 400, 500, and/or 600.) The management node may send a VM Registration Request message 700 to the source Hypervisor(s). For IPv4 VMs, the source hypervisor may create IPv4 host route (s). The source VM IPv4 address may be obtained from the source hypervisor's binding Update List entry matching the VM and the destination VM IPv4 address may be obtained from the VM Registration Request 700 message. The source hypervisor may transfer the VM state information to the destination Hypervisor in IPv4 (e.g. over TCP connection(s)) by using the source and destination Proxy-CoA IPv4 addresses.

In case Network Address Translation (NAT) is used, changing the NAT box after mobility may invalidate all private addresses the VM was assigned at the source hypervisor. The protocol(s) described herein may allow for VM mobility in the presence of NAT when the NAT box is centrally located in a data center (e.g. positioned at the border router 170.) In this case VM mobility of privately addressed VMs may be restricted to intra-data center movement.

Figure 9:
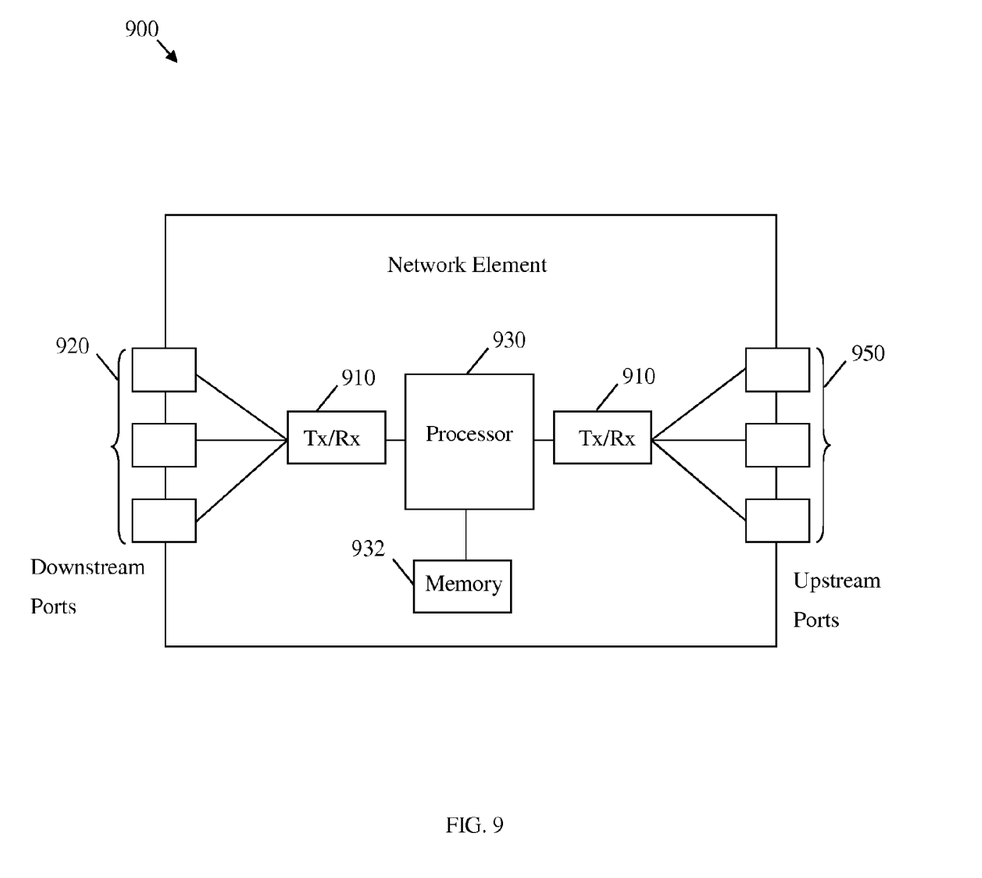
FIG. 9 is a schematic diagram of an embodiment of a NE.

FIG. 9 is a schematic diagram of an embodiment of a network element (NE) 900, which may comprise a server 110, 115, and/or 119, a ToR switch 140, a switch 155, an aggregation switch 150, a router 160, a border router 170, and/or a storage center 120 and/or a network management node 130. One skilled in the art will recognize that the term NE encompasses a broad range of devices of which NE 900 is merely an example. NE 900 is included for purposes of clarity of discussion, but is in no way meant to limit the application of the present disclosure to a particular NE embodiment or class of NE embodiments. At least some of the features/methods described in the disclosure, for example VM registration and/or mobility methods 200, 300, 400, 500, and/or 600, may be implemented in a network apparatus or component such as an NE 900. For instance, the features/methods in the disclosure may be implemented using hardware, firmware, and/or software installed to run on hardware. The NE 900 may be any device that transports frames through a network, e.g., a switch, router, bridge, server, a client, etc. As shown in FIG. 9, the NE 900 may comprise transceivers (Tx/Rx) 910, which may be transmitters, receivers, or combinations thereof. A Tx/Rx 910 may be coupled to plurality of downstream ports 920 for transmitting and/or receiving frames from other nodes, a Tx/Rx 910 coupled to plurality of upstream ports 950 for transmitting and/or receiving frames from other nodes. A processor 930 may be coupled to the Tx/Rxs 910 to process the frames and/or determine which nodes to send frames to. The processor 930 may comprise one or more multi-core processors and/or memory devices 932, which may function as data stores, buffers, etc. Processor 930 may implement hypervisor 111, hypervisor 116, VM 112, and/or VM 117. Processor 930 may be implemented as a general processor or may be part of one or more application specific integrated circuits (ASICs) and/or digital signal processors (DSPs). The downstream ports 920 and/or upstream ports 950 may contain electrical and/or optical transmitting and/or receiving components. NE 900 may or may not be a routing component that makes routing decisions.

It is understood that by programming and/or loading executable instructions onto the NE 900, at least one of the processor 930, downstream ports 920, Tx/Rxs 910, memory 932, and/or upstream ports 950 are changed, transforming the NE 900 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, R1, and an upper limit, Ru, is disclosed, any number falling within the range is specifically disclosed. In particular, the following numbers within the range are specifically disclosed: $R=R_1+k*(R_u-R_1)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A network element (NE) comprising:
a local hypervisor configured to:
  receive information for a first virtual machine (VM) from a source hypervisor;
  initiate the first VM; and
  send a first VM mobility registration request to a management node, wherein the first VM mobility registration request comprises a VM identifier associated with the first VM and an internet protocol (IP) address associated with the local hypervisor;
  send information for a second VM to a destination hypervisor;
  maintain a binding update list, wherein the binding update list associates an IP address of the second VM at the local hypervisor to an IP address of the second VM at the destination hypervisor; and remove data associated with the second VM from the binding update list when incoming traffic for the second VM stops.

2. The NE of claim 1, wherein the local hypervisor is further configured to:
obtain an IP address for the first VM; and
send the first VM IP address to the first VM.

3. The NE of claim 2, wherein the local hypervisor is further configured to encode the first VM IP address in the first VM mobility registration request.

4. The NE of claim 3, wherein the first VM IP address is encoded in a VM address option.

5. The NE of claim 1, wherein the local hypervisor is further configured to send a domain name service (DNS) update to a DNS server, wherein the DNS update updates DNS information associated with the first VM to cause network traffic associated with the first VM to be routed to the local hypervisor.

6. The NE of claim 1, wherein the local hypervisor is further configured to:
create a third VM; and
send a third VM mobility registration request to the management node, wherein the third VM mobility registration request comprises a VM identifier associated with the third VM and the local hypervisor IP address.

7. The NE of claim 1, wherein the local hypervisor is further configured to receive a second VM mobility registration request from the management node, wherein the second VM mobility registration request comprises the second VM IP address at the destination hypervisor.

8. The NE of claim 7, wherein the local hypervisor is further configured to:
send a VM mobility registration reply to the management node; and
create a host route to route incoming traffic for the second VM to the second VM IP address at the destination hypervisor.

9. A management node comprising:
a binding cache; and
a processor,
wherein the processor is configured to:
receive a first virtual machine (VM) mobility registration request from a first hypervisor, wherein the first VM mobility registration is associated with a VM; and
record VM information from the first VM mobility registration request in an entry of the binding cache, and
wherein the processor is further configured to store a source address of the first VM mobility registration request in the binding cache entry as a proxy care-of-address (Proxy-COA) for the VM.

10. The management node of claim 9, wherein the first VM mobility registration request comprises:
a VM link layer identifier option comprising a media access control (MAC) address associated with the VM;
a VM identifier option comprising an identifier associated with the VM;
a VM address option comprising a internet protocol (IP) address associated with the VM; and
the source address of the first VM mobility registration request.

11. The management node of claim 9, wherein the processor is further configured to send a VM registration reply message comprising a status field, and wherein the status field indicates whether the first VM mobility registration request is accepted.

12. The management node of claim 9, wherein the processor is further configured to:
receive a second VM mobility registration request from a second hypervisor after receiving the first VM mobility registration request, wherein the second VM mobility registration request indicates the VM has moved to the second hypervisor; and
modify the binding cache entry to set a source of the second VM mobility registration request as the Proxy-COA for the VM.

13. The management node of claim 12, wherein the processor is further configured to send a third VM mobility registration request to the first hypervisor after receiving the second VM mobility registration request, wherein the third VM mobility registration request comprises the Proxy-COA for the VM at the second hypervisor, an internet protocol (IP) address associated with the VM at the second hypervisor, or combinations thereof.

14. A method comprising:
moving a virtual machine (VM) from a source hypervisor to a destination hypervisor, wherein the destination hypervisor sends a first VM Mobility Registration Request to a management nod,
wherein the VM is an internet protocol version four (IPv4) VM, wherein the destination hypervisor is a dual stack, and wherein the first VM Mobility Registration Request is sent in IP version six (IPv6).

15. The method of claim 14 further comprising:
receiving a second VM Mobility Registration Request from the management node indicating a VM address at the destination hypervisor; and
creating a host route pointing to the VM address at the destination hypervisor.

16. The method of claim 15, wherein the host route enables the source hypervisor to route ongoing VM communications to the destination hypervisor.

17. The method of claim 14 further comprising:
keeping an entry in a binding update list if the VM was in communication before it was moved; and
removing the entry from the binding update list after receiving a second VM Mobility Registration Request from the management node if the VM was not in communication before it was moved.

18. A method comprising:
moving a virtual machine (VM) from a source hypervisor to a destination hypervisor, wherein the destination hypervisor sends a first VM Mobility Registration Request to a management node;
keeping an entry in a binding update list if the VM was in communication before it was moved; and
removing the entry from the binding update list after receiving a second VM Mobility Registration Request from the management node if the VM was not in communication before it was moved,
wherein the VM entry is kept in the binding update list until all inbound traffic to the VM stops.

19. The method of claim 14 further comprising:
opening a Transmission Control Protocol (TCP) connection with the destination hypervisor; and
transferring a memory state of the VM over the TCP connection.

20. The method of claim 14, wherein the source hypervisor and the destination hypervisor are positioned in a common datacenter, wherein the management node exchanges a third VM Mobility Registration Request with a default router associated with the source hypervisor, and wherein the default router establishes host routes to redirect traffic from correspondent nodes or correspondent VMs connected to the default router.

21. The method of claim 14, wherein the source hypervisor is positioned in a first datacenter, wherein the destination hypervisor is positioned in a second datacenter, and wherein host routes are propagated between a border router at the first datacenter and a border router at the second datacenter using inter-domain routing protocols.

\* \* \* \* \*

UNITED STATES PATENT AND TRADEMARK OFFICE
CERTIFICATE OF CORRECTION

| | | |
|---|---|---|
| PATENT NO. | : 9,184,981 B2 | Page 1 of 1 |
| APPLICATION NO. | : 13/791142 | |
| DATED | : November 10, 2015 | |
| INVENTOR(S) | : Behcet Sarikaya | |

It is certified that error appears in the above-identified patent and that said Letters Patent is hereby corrected as shown below:

On the Title Page, Page 2, References Cited, Other Publications:

Delete "Lasserre, M., "Framework for DC Network Virtualization," draft-ietf-nvo3-framework-02.K February 4, 2013, 25 pages." and insert -- Lasserre, M., "Framework for DC Network Virtualization," draft-ietf-nvo3-framework-02.txt, February 4, 2013, 25 pages. --

In the Claims:

Column 16, Claim 14, Lines 22-30, should read as:

14. A method comprising:
    moving a virtual machine (VM) from a source hypervisor to a destination hypervisor, wherein the destination hypervisor sends a first VM Mobility Registration Request to a management node,
    wherein the VM is an internet protocol version four (IPv4) VM, wherein the destination hypervisor is a dual stack, and wherein the first VM Mobility Registration Request is sent in IP version six (IPv6).

Signed and Sealed this
Twenty-sixth Day of April, 2016

Michelle K. Lee
*Director of the United States Patent and Trademark Office*